Dec. 21, 1948.  F. E. DEATHERAGE  2,456,684
PROCESS OF RENDERING LARD
Filed Jan. 31, 1944
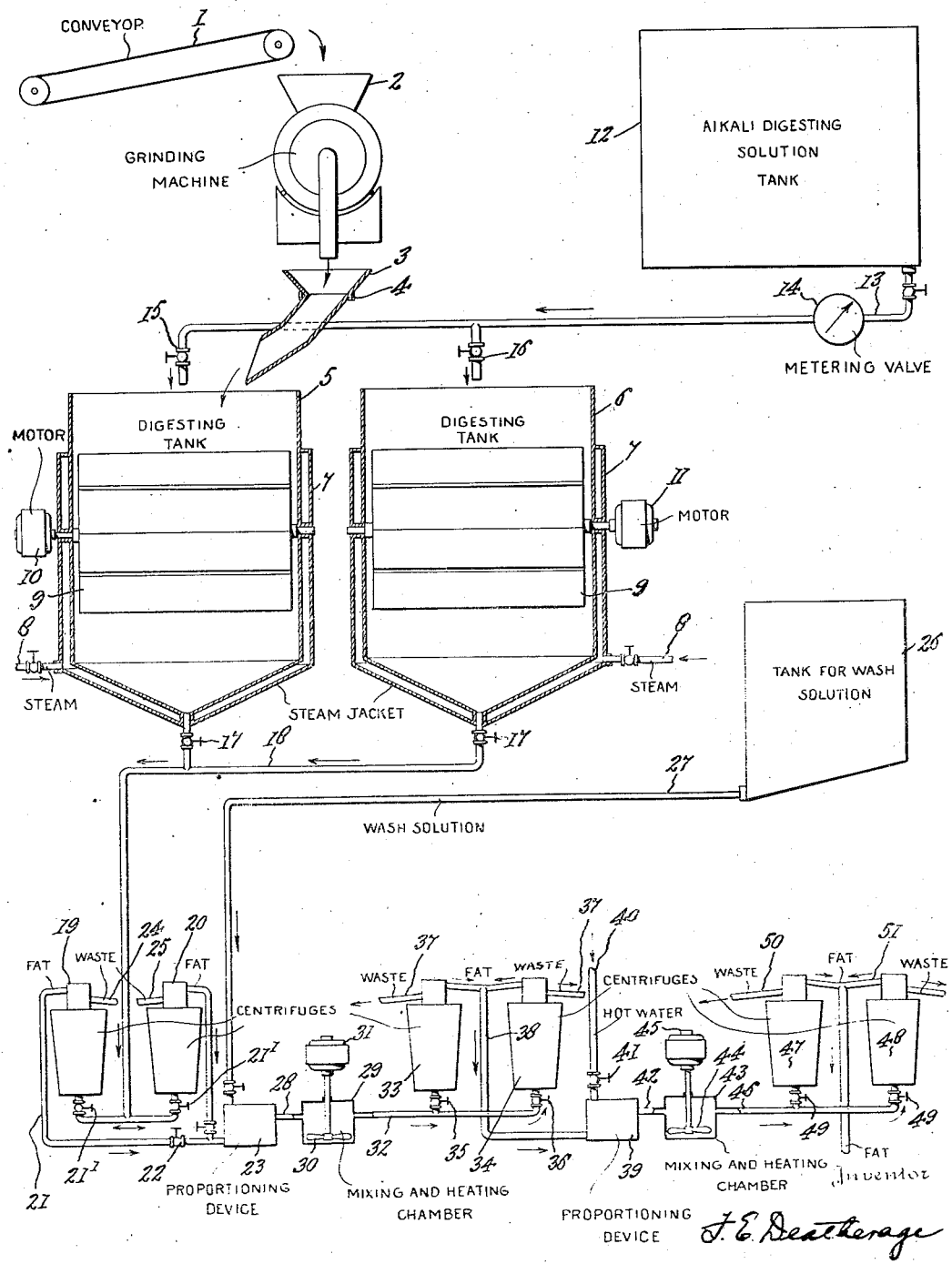

Patented Dec. 21, 1948

2,456,684

UNITED STATES PATENT OFFICE 2,456,684

PROCESS OF RENDERING LARD

Fred E. Deatherage, Cincinnati, Ohio, assignor to The Kroger Grocery & Baking Company, Hamilton County, Ohio Application January 31, 1944, Serial No. 520,519

16 Claims. (Cl. 260—412.7)

The present invention relates to a process of rendering fat-containing tissues such as mutton, beef, and pig, and more particularly the invention relates to an improved alkali rendering process for the commercial production of lard.

This application is a continuation in part of applicant's copending application, Serial Number 440,229, filed April 23, 1942, now abandoned, for Process of rendering lard.

For purposes of illustration, but not by way of limitation, the invention is hereinafter described as practiced for the production of lard.

Lard as heretofore made and sold commercially had certain disadvantages which contributed to its loss of popularity in the market in favor of lard substitutes. For example, the color of many lards in the solid state as well as in the liquid state was unsightly, generally being a gray yellow or gray brown, which gave the appearance of dirt or foreign matter in the lard; the odor often had a burnt quality which was quite pronounced during cooking; poor keeping qualities when exposed to air at room or elevated temperatures; a relatively high acid content resulting in low smoking temperatures and objectionable odor and taste.

The color of refined lard should be white, the odor and taste neutral and the smoking temperature high. Lard substitutes have these qualities, with the result that they have been gradually dominating the market. This should not be the case, since lard or pig fat as a food is normally more nutritious and easier to digest than the hydrogenated products which are commonly used in place of lard. Furthermore, pig fat, if properly handled, requires less processing than does a vegetable product. Of the present methods or processes commonly followed in the production of lard, open kettle rendering, prime steam rendering and vacuum rendering are those which involve cooking of the raw tissue. In order for the product of these three methods to compete with most lard substitutes, the lard must be alkali refined, bleached, deodorized and then fortified with a suitable antioxidant, which additional processing raises the cost higher and lowers the yield of the ultimate saleable product.

When pig fat is extracted uncooked from the raw tissue by mechanical means (centrifugation) or solvents, the lard obtained has few objectionable properties above noted, and while the keeping quality is not great, it surpasses that of packing house lard by at least 50%. However, a solvent or mechanical extraction of lard has heretofore proved too costly for commercial production.

Lard rendering or recovery from raw pig tissue fundamentally involves separation of the fat from the aqueous portion of the tissue (tissue juices and blood) and from the solid protein portion of the tissue (cell walls, skin and connective tissue). Mechanical or centrifugal separation of the fat from the aqueous portion or phase is relatively easy, but separation from the tissue solids is more difficult because of the hydrophilic nature of the tissue and because of the mechanical occlusion of the fat by the tissue solids. If the solids are caused to dissolve in the aqueous phase, recovery of the lard is simplified in that separation is from a single water phase. Solution of the solid protein constituents into the water phase can be accomplished by enzymatic digestion of the solids to water soluble materials, or by the addition of a suitable reagent to the tissue to dissolve the solid matter and/or change it to a water-soluble substance. Enzymatic digestion yields an inferior lard and is costly and time-consuming, but solution of the protein solids into the aqueous phase may be accomplished readily and cheaply if the proper process is followed, and it is an object of the present invention to provide such a process. It is also an object of the present invention to provide an alkali refined lard having an unobjectionable odor, low acid value, and a high smoking point.

The accompanying drawing schematically illustrates suitable apparatus for practicing the present invention.

Referring to the drawing, a weighed quantity of fatty tissue such as back, ham, loin or leaf fat is brought by a conveyor 1 into a grinding machine 2 which may be a suitable type of meat grinder. From the meat grinder 2 the ground fatty tissue is discharged into a downwardly extending chute 3 which may be rotatably mounted on a swivel 4 so that the fatty tissue is discharged into either digesting tanks 5 or 6. Both digesting tanks 5 and 6 are provided with steam jackets 7 which are operatively associated with steam pipes 8. The digesting tanks 5 and 6 are also equipped with slow moving, ferris-wheel type agitators 9 which may be driven by motors 10 and 11, respectively. As the ground fat is discharged into digesting tanks 5 or 6, the required amount of alkali digesting solution prepared in tank 12 is passed through a valve-controlled pipe line 13 and through a metering valve 14 in said pipe line and is discharged into tanks 5 or 6 through valve-controlled nozzles 15 and 16, respectively. The digesting solution comprises per 100 pounds of water approximately 1.75 pounds of sodium hydroxide and five pounds of sodium chloride, and the quantity required for complete digestion of the non-fat tissue solids varies per 100 pounds of raw tissue to from about 25 to about 50 pounds of the digesting solution, depending on the nature of the tissue to be rendered. For example, the lower amount of digesting solution may be used for leaf fat tissue and the higher amount is advantageously employed for ham, shoulder, or other fat tissue having a large relative amount of nonfat tissue solids associated therewith. While the fatty tissue is in the tanks 5 or 6, respectively, it is heated to the highest temperature that will facilitate digestion of the non-fat tissue solids, yet which will not promote any appreciable fat hydrolysis. For example, for the digestion, the hot digesting solution, which may be preheated if desired in alkali digestion solution tank 12 by suitable means (not shown) is mixed with relatively cold ground tissue in tanks 5 and 6, and in the course of the digestion, the temperature is raised without localized boiling to a digestion temperature of from about 180° to 190° F. To attain this temperature usually requires approximately one-half hour. After about an additional half hour and when digestion of the fatty tissue is completed as evidenced by the formation of a biphasic (fat and water phases) liquid mixture, the liquid is caused to flow by gravity through valves 17 which are located in the bottoms of digesting tanks 5 and 6, respectively, through a conduit 18 into centrifuges 19 and 20, respectively, which separate the fat from the aqueous digestion liquor and the centrifuges are provided at the bottom portions thereof with valves 21'. The separated fat flows from centrifuges 19 and 20, respectively, through conduit 21 having a valve 22 therein into a proportioning device 23 where a proportioned quantity of washing solution is introduced into the fat. At the same time, the waste liquid from the fat separation may be discarded from centrifuges 19 and 20 through overflow pipes 24 and 25, respectively, which are located at the tops of centrifuges 19 and 20, respectively. A solution which is adapted to be employed for the first washing operation of the fatty tissue and which preferably has dissolved therein, per 100 pounds of water, approximately 5 pounds of sodium chloride and approximately 0 to 20 grams of calcium chloride is stored in tank 26 where it may be heated to a temperature of about 160° to 165° F. by suitable means (not shown) and is passed from said tank through a conduit 27 into the proportioning device 23 where it is admixed with the fat. The fat and washing solution is then pumped by said proportioning device through conduit 28 into a mixing and heating chamber 29 which is provided with a stirring device 30 which is driven by a motor 31. After being mixed and heated to a suitably elevated temperature (160° to 200° F.) in the mixing and heating chamber 29, the mixture of washing liquids and fat is then passed through a conduit 32 into centrifuges 33 and 34, respectively, which are provided with valves 35 and 36, respectively, and the waste washing fluid is permitted to escape from centrifuges 33 and 34, respectively, through overflow pipes 37 at the top of centrifuges 33 and 34 while the washed fat is conducted through conduit 38 into a proportioning device 39 where it may be admixed with a suitable quantity of hot water (heated to a temperature of approximately 160° to 210° F.). The hot water may be admitted to the proportioning device 39 through a pipe 40 which is provided with a valve 41. The proportioning device 39 serves as a pump and forces the mixture of fat and hot washing fluid through conduit 42 into a mixing chamber 43 which is provided with a stirring device 44 which may be electrically driven by a suitable motor 45. From the mixing chamber 43, the heated fat and washing solution is forced through conduit 46 into centrifuges 47 and 48, respectively, which are provided at their lower portions with valves 49. At the upper portion of said centrifuges there is provided an overflow pipe 50 for the escape of waste liquid and said pipe communicates with centrifuges 47 and 48 and in communication with the tops of said centrifuges there is also provided a conduit 51 for the escape of the rendered and washed fat. As thus treated, the fat is ready for any or all of the conventional drying, filtering, winterizing, deodorizing and plasticizing operations that are applicable to edible fats and oils.

As indicated above, the process of the present invention consists in grinding or otherwise reducing the raw fat tissue, adding thereto warm aqueous sodium hydroxide (or other aqueous solutions of monovalent bases) and mixing the same intimately with the ground tissue; and while stirring, the entire mixture is heated to such a temperature and for such a period of time as to allow for the almost complete solution of the solid matter (usually 30 to 60 minutes at 80° to 95° C. (176° to 203° F.) is sufficient); after which the fat is separated preferably while melted from the aqueous phase by gravity settling and/or centrifugation, and it is then washed with salt water; for instance, 5% sodium chloride solution; and/or hot water, and is finally separated while melted from the wash water in the same manner, viz., by gravity settling and/or centrifugation. Usually two or three washings are sufficient to free the fat from any traces of soap or free alkali which may be unavoidably associated therewith.

The following specific examples will serve to illustrate and explain the present invention:

*Example 1.*—A quality of raw ground pig fat and half its weight (depending on the type of tissue) of 1.75% aqueous sodium hydroxide are mixed and then warmed to 80° to 95° C. This temperature is maintained for a period of 30 to 60 minutes, during which time the mixture is occasionally gently stirred. Almost all of the solid matter of the tissue goes into the solution. Although it is not absolutely necessary, any small amount of undissolved matter may be strained off if desired. The lard is separated while melted from the aqueous phase containing any small amount of undissolved solid matter by gravity settling and/or centrifugation. The warm melted lard is then washed with water and separated as before. The water washing may be repeated until all traces of soap and free alkali are removed from the lard. Usually two or three washings are sufficient.

There is a tendency for a loss of lard by emulsification in the aqueous alkaline phase since a small percentage of the lard may become entrained in and therefore discarded with the alkaline liquor. This loss may be prevented by proper manipulation, depending upon the tissue. For example, yields of lard obtained by this method may run as high as 90 to 91% for back fat and 92% for leaf fat and are better than in present known commercial methods and represent almost complete recovery of the fat from the original tissue.

The product thus obtained keeps somewhat better than present day lards; its coloring is a desirable light delicate yellow; its faint odor is not undesirable, and if desired, can be removed by ordinary commercial deodorization to give a perfectly bland fat; it is completely refined and neutral with an acid value of 0.01% or less; the smoke point is from 450°–515° F., and at this temperature the lard does not become dark or discolored.

Although a completely refined (alkali refined and neutral) lard is obtained, the refining is secondary to the rendering, the alkali being used primarily to dissolve the tissue solids and therefore facilitate recovery of the lard from the tissue.

This process of alkali rendering has the advantage of a higher yield of a superior lard when compared to present day packing house rendering methods.

*Example 2.*—Same as Example 1 except that instead of 1.75% aqueous sodium hydroxide, a water solution containing 1.75% sodium hydroxide and 5.0% salt (sodium chloride) is used.

This salt-alkali solution has the same efficiency as the 1.75% sodium hydroxide in dissolving the tissue solids, and at the same time prevents excessive emulsification of the lard in the aqueous alkaline phase and therefore facilitates more complete separation of the lard from the alkaline liquor. The yields and product are substantially the same as in Example 1.

*Example 3.*—Same as the alkali-salt method of Example 2 except that following the digestion by the alkali salt solution and when the tissue solids are in solution, approximately 80% of the original free alkali is neutralized by the addition of a suitable acid, preferably hydrochloric.

This modified procedure of Example 3 with its diminished free alkali further facilitates separation of the lard from the aqueous alkaline phase and lessens the loss of lard by emulsification. The yields and product are substantially the same as in the alkali rendering method of Example 1.

*Example 4.*—The ground raw tissue is treated as in Example 1 or Example 2 above. Following the alkaline digestion the entire mixture is acidified to a pH of 3 with sulfuric or hydrochloric acid. This causes all emulsions to break immediately and also causes a partial precipitation of the protein dissolved in the aqueous alkaline phase. However, by proper manipulation the precipitated protein does not interfere with the separation of the fat by gravity settling and/or centrifugation.

The lard obtained by Example 4 is somewhat different from that obtained from Examples 1, 2 and 3. While the fat is the same color as that obtained by the alkali-rendering method, the lard is not alkali-refined and therefore contains a higher percentage of free fat acids, viz, the free acid naturally occurring in lard plus that released by the acidulation of the soaps formed by the small amount of fat saponification (hydrolysis) which may accompany the alkali digestion of the tissue solids. The yields by Example 4 are slightly higher because there is no loss by emulsification during separation of the fat and because the product obtained contains a relatively large amount of free fat acid. However, in order to get the same quality of lard as obtained in Examples 1, 2 and 3, a supplementary alkali refining or prolonged deodorization is necessary which more than offsets the higher yield.

The time of digestion in all of the foregoing examples is dependent on the concentration or pH of the alkali and the temperature.

The temperature should be high enough to melt the fat and facilitate solution of the tissue yet low enough to maintain saponification of the fat at a minimum.

The strength of the caustic should be high enough to promote tissue digestion yet low enough to keep down saponification. A one-tenth normal (0.4% sodium hydroxide solution may accomplish this result for many types of tissue. Weaker alkali solutions have been found unsatisfactory. Two percent sodium hydroxide causes excellent digestion of the more difficult tissue solids without appreciable saponification of the fat while alkali as strong as 5% sodium hydroxide causes considerable saponification of the fat even though it digests the tissue solids satisfactorily.

*Example 5.*—One hundred-twenty parts of raw ground animal tissue is mixed with a hot solution consisting of fifty parts of water, 0.875 part of sodium hydroxide and 2.5 parts of sodium chloride. While being gently stirred, the mixture is heated to 85–90° C. for 30 to 60 minutes. All the tissue is dissolved and the fat is separated by centrifugation. The fat while hot is washed with ¼ its weight or less of a 5% salt solution; then it is washed once or twice with ¼ its weight or less of hot water and finally the fat is washed once with ⅕ its weight or less of 0.5 to 1% of phosphoric acid solution. After each washing the fat is separated by centrifugation. The fat is then ready after drying and filtering for further processing such as complete steam deodorization and plasticizing.

It will be seen that the fundamental basis of the herein disclosed process is that the solid matter of the raw tissue is converted by dilute sodium hydroxide to a solution in an aqueous phase immiscible in the melted fat, the two liquid phases being mechanically separated, giving a superior lard. The improved process utilizes a relatively weak alkali, which constitutes an advantage from a standpoint of economy. Furthermore, the salts necessary to prevent emulsification are incorporated in the original digestion mixture, so that little or no emulsion is formed and the fat can be readily separated from the digest by gravity or centrifugation. The primary separation yields fat containing only a small amount of the aqueous phase and this may be readily removed by the subsequent washing operations with a solution of sodium and calcium chloride and/or ordinary hot water.

The composition and quantity of digesting solution may be varied in accordance with the type of tissue to be rendered. A digesting solution which is satisfactory for most tissues may be composed of 100 parts water, 1.75 parts sodium hydroxide and 5.0 parts of salt. When this digesting solution is used at a 50% level (50% of tissue to be rendered as the water of the digesting solution) practically all types of fat tissue are effectively reduced to two phases—fat and aqueous alkaline containing the non-fat constituents of the tissue. However, for the digestion of many types of tissue which are used for making lard, beef tallow, etc., less than 50% of the tissue as digesting solution may be quite satisfactory. For tissue containing considerable skin and connective tissue, as ham fat, 45 to 50% of the tissue as digesting solution (water basis) may be required, while for back fat, 40% may prove sufficient and for leaf fat 30% or less may suffice. It is advantageous to use the least quantity of digestion solution compatible with complete digestion. This is not only true from the standpoint of saving digestion solution, but also from the standpoint of increasing the efficiency of the process by increasing the fat production rate where centrifugal separation is employed (such separation being the most practical and efficient).

This is at once apparent since the rate of fat production in a continuous centrifugal separation of this type is directly proportional to the total throughput rate (fat and water phases) of the centrifuge and inversely proportional to the amount of aqueous phase in the mixture to be centrifugally separated.

The quantity of wash solution can vary widely. Usually 25%, 20% or less of the weight of the fat as wash solution is satisfactory, particularly if centrifugal separation is employed. Although not absolutely necessary, it is advantageous to use a salt solution of 5% sodium chloride in the first washing. In practice, the separated fat is washed once with the 5% salt solution which is then followed with one or more washings with water and/or an acid wash containing 0.2 to 0.5 pound of phosphoric acid or its equivalent of other suitable edible acid per 100 pounds of water. However, in rendering beef tallow, mutton tallow and the like, it may be desirable to use a salt solution for all wash operations. For these washing operations, it has been found advantageous to use in making wash solutions, commercial grade salt or better grades of salt to which approximately 0.5% calcium chloride has been added. As with a digesting solution, it is equally advantageous for the same reasons as pointed out above to use a minimum amount of wash solutions compatible with the most efficient washing and subsequent centrifugal separation of the fat from the washing media.

Preparation of the tissue for rendering is of importance. It is desirable that the grinding of the tissue result in a substantially complete maceration as well as dispersion of the naturally occurring proteolytic enzymes throughout the whole mass. When this is done, extremely powerful enzymes may start with the initial tissue digestion in a manner such as to greatly facilitate the substantially complete digestion subsequently resulting from the alkali treatment. The tissue should be at body temperature, or approximately so before being ground and should not reach a temperature high enough to destroy the enzymes or to denature the tissue protein, nor low enough to prevent dispersion of the enzymes through the entire mass of tissue during the grinding operation. The tissue may then be allowed to stand for a few hours at room or body temperature, or longer if the tissue is cold. This gives the enzymes sufficient time for initial protein hydrolysis or digestion and thereby facilitates subsequent alkali digestion.

The time allowed for digestion is necessarily a function of and dependent on the temperature. Usually 30 to 60 minutes is sufficient to result in substantially complete digestion of the tissue solids. Less time for digestion is required if the temperature of digestion is increased. In practice, a digesting temperature between 80 to 95° C. has been found satisfactory. The higher the temperature, the faster the rate of digestion. However, the height of the digestion temperature should be limited to avoid fat saponification and hydrolysis, it being an object of the present invention to promote alkali digestion of the protein or other tissue solids with minimum of or substantially no hydrolysis of fats.

Experiments have shown that if the tissue is warmed before adding the alkali, some of the tissue protein may be heat-denatured. This denatured protein is more difficult to digest than the unaffected tissue. This difficulty is eliminated if the alkali is added to the tissue before the latter is heated and then mixed with the tissue as the temperature rises.

Although this process of alkali rendering has been described as a unit batch operation, it is possible to operate all individual steps in a continuous manner and to integrate these various operations into an essentially continuous process from start to finish.

The product resulting from the process of the present invention, when compared to lards prepared by present day commercial methods, shows a market superiority in color, odor, keeping quality, acid value, and smoking and decomposition temperatures. The color is a desirable pale delicate yellow; the faint odor is suggestive of sweet lard and is not undesirable, and, if desired, can be removed completely by ordinary commercial deodorization; the lard, depending on the kind, will keep from 4 to 5 days to 9 or 10 days when exposed to air at 650° C. as compared to 3 to 6 or 7 days for ordinary run commercial lards subjected to the same conditions; the acid value is 0.01% or less; the smoke point is from 450° to 520° F., and the yield, depending on the quality of the tissue may run as high as 87% to 90% for back fat and 92% for leaf fat.

If desired, the product may be hydrogenated to improve its keeping characteristics and alter its physical properties. Also, an antioxidant may be added before or after hydrogenation or after deodorization, depending upon conditions. For example, it has been found that lard might be effectively stabilized against the development of rancidity therein by incorporating therein from about 0.01% of ethyl an ester of gallic acid and about .01% ascorbic acid or about 0.01% an ester of gallic acid and 0.01% of phosphoric acid. For instance, lard containing such antioxidants remained non-rancid for periods ranging from 95 to 100 days.

It will be understood that certain limited changes in the improved process may be adopted without departing from the spirit or scope of the invention as defined by the appended claims.

What is claimed is:

1. The process of rendering animal fat of the group consisting of mutton, beef and pig fat, which process consists in macerating the animal fat to disintegrate animal tissue therein, adding an aqueous alkali solution in an amount not in excess by weight of the fat and of a concentration of at least 0.4% alkalinity; mixing the same intimately with the reduced fat and tissues and heating the mixture to a temperature between 70° to 100° C. for a period between about 30 to 60 minutes, separating the fat from the aqueous constituents, washing the separated fat with water and thereafter separating the wash water from the fat.

2. The process of rendering animal fat of the group consisting of mutton, beef and pig fat, which process consists in grinding it to disintegrate animal tissues therein and dispersing the naturally occurring proteolytic enzymes throughout the mass, adding heated aqueous alkali in an amount not substantially in excess by weight of the animal fat and mixing the same intimately therewith, heating the mixture while stirring to a temperature not substantially in excess of 95° C. and for a period of time not substantially in excess of 60 minutes whereby substantially all the tissue solids are dissolved with substantially no saponification and emulsification of fat, separating the fat from the dissolved tissue solids, subjecting the separated fat while warm to a plurality of water washings at least one of which consists of an aqueous salt solution.

3. The process of rendering animal fat of the group consisting of mutton, beef and pig fat, which process consists in macerating the animal fat at approximately body temperature and dispersing the naturally occurring proteolytic enzymes throughout the macerated mass, allowing the macerated mass to stand for a period of more than 1 hour whereby said enzymes initiate digestion of the non-fat tissue solids, adding aqueous alkali in an amount not substantially in excess by weight of the macerated mass and mixing the same intimately therewith, heating the mixture while stirring not in excess of 100° C. for a period not substantially in excess of 1 hour whereby substantially all of the tissue solids are dissolved with no appreciable saponification and emulsification of fat, separating the fat from the solution while warm, water washing the separated fat, and thereafter separating the wash water from the fat.

4. The process of rendering animal fat selected from the group consisting of beef, mutton and pig fat, which process consists in macerating the fat to disintegrate raw animal tissue therein, adding an aqueous alkaline solution, the alkalinity of which is equivalent to at least 0.4% sodium hydroxide in water and mixing the same with the macerated fat in the approximate proportion by weight of ½ to 1 part solution to each part macerated fat, heating the mixture to between 70 to 100° C. whereby substantially complete solution of the solid matter takes place thereby thoroughly rendering and refining the fat, separating the rendered and refined fat from the aqueous constituents, and washing the separated fat with water.

5. The process of rendering crude lard which consists in mechanically mascerating crude lard to disintegrate animal tissue therein, adding an aqueous alkali solution in an amount not in excess by weight of the crude lard and of a concentration of at least 0.4% alkalinity, mixing the same intimately with the reduced tissues and heating the mixture to a temperature between 70° to 100° C. for a period between about 30 to 60 minutes, separating the fat from the aqueous constituents, washing the separated fat with water and thereafter separating the wash water from the fat.

6. The process of rendering and refining crude lard which consists in mechanically mascerating crude lard to disintegrate animal tissues therein, adding a caustic aqueous alkaline solution in an amount not substantially in excess by weight of crude lard and the alkalinity of which is equivalent to at least 0.4% sodium hydroxide in water, mixing the same with the ground tissue and heating the mixture for a period not in excess of 60 minutes at a temperature not in excess of 100° C. whereby substantially complete solution of the solid matter takes place with no appreciable saponification and emulsification of fat which substantially remains in a free state apart from the aqueous phase, separating the fat from the aqueous constituents, and washing the separated fat with water.

7. The process of rendering crude lard which consists in mechanically grinding the crude lard to subdivide the animal tissue therein and mixing with the crude lard an aqueous sodium hydroxide solution, the alkalinity of which is equivalent to at least 0.4% sodium hydroxide in water and in an amount substantially equal in weight to one-half the amount of lard being treated, heating the mixture to between 70° to 100° C. over a period of between about 30 to 60 minutes, separating the fat from the aqueous constituents, and water-washing the separated fat.

8. The process of rendering crude lard which consists in mechanically mascerating the crude lard and incorporating therein substantially 0.4% aqueous sodium hydroxide in an amount substantially equal in weight to one-half the amount of lard being treated whereby the fat tissue solids are digested to water soluble substances with substantially no emulsification and saponification of fat while heating the mixture to approximately 80° to 95° C. while stirring the same over a period of between about 30 to 60 minutes, separating the fat from the aqueous constituents, and water-washing the separated fat.

9. The process of rendering and refining lard which consists in mixing ground raw pig tissue and aqueous sodium hydroxide the alkalinity of which is equivalent to at least 0.4% sodium hydroxide in water and in an amount substantially equal in weight to one-half the amount of tissue being treated whereby the fat tissue solids are digested to water soluble substances with substantially no emulsification and saponification of fat while heating the mixture to between 80° to 95° C. while stirring the same over a period of between about thirty and sixty minutes, separating the lard from the aqueous constituents and thereafter water-washing the lard.

10. The process of rendering crude lards which consists in mechanically reducing it and incorporating therein an alkaline solution of a concentration of at least 0.4% and having a pH value of substantially 12.9 in an amount substantially equal in weight to the amount of lard being treated, heating the mixture to approximately 80° C., acidifying the mixture to a pH value of substantially 3 by the addition of a neutralizing acid, separating the fat from the aqueous constituents and thereafter water washing the lard.

11. The process of rendering crude lard which consists in grinding it to disintegrate animal tissues therein and dispersing the naturally occurring proteolytic enzymes throughout the mass, adding heated aqueous alkali in an amount not substantially in excess by weight of the crude lard and mixing the same intimately with the crude lard, heating the mixture while stirring to a temperature not substantially in excess of 95° C. and for a period of time not substantially in excess of 60 minutes whereby substantially all the tissue solids are dissolved with substantially no saponification and emulsification of fat, separating the fat from the dissolved tissue solids, subjecting the separated fat while warm to a plurality of water washings at least one of which consists of an aqueous salt solution.

12. The process of rendering crude lard which consists in mechanically mascerating the crude lard at approximately body temperature and dispersing the naturally occurring proteolytic enzymes throughout the mass, allowing the ground mass to stand for a period of more than 1 hour whereby said enzymes initiate digestion of the non-fat tissue solids, adding aqueous alkali in an amount not substantially in excess by weight of the ground mass and mixing the same intimately therewith, heating the mixture while stirring not in excess of 100° C. for a period not substantially in excess of 1 hour whereby substantially all of the tissue solids are dissolved with no appreciable saponification and emulsification of fat, separating the fat from the solution while warm, water washing the separated fat, and thereafter separating the wash water from the fat.

13. The process of rendering crude lard which consists in grinding the crude lard to disintegrate raw animal tissue therein at approximately body temperature and dispensing the naturally occurring proteolytic enzymes throughout the mass, allowing the ground mass to stand for a period of more than 1 hour whereby said enzymes initiate digestion of the non-fat tissue solids, adding aqueous alkali in an amount not substantially in excess by weight of the ground mass and mixing the same intimately therewith, heating the mixture while stirring not in excess of 100° C. for a period not substantially in excess of 1 hour whereby substantially all of the tissue solids are dissolved with no appreciable saponification and emulsification of fat, separating the fat from the tissue while warm by gravity and centrifuging, washing the separated fat while warm with an aqueous salt solution and water, and thereafter separating the wash water from the fat.

14. The process of rendering crude lard which consists in mechanically grinding it to mechanically disintegrate raw animal tissue contained in the crude lard fat tissue, incorporating an aqueous alkaline solution the alkalinity of which is equivalent to at least 0.4% sodium hydroxide and sufficient to digest the non-fat tissue solids to water soluble substances, heating the mixture to a temperature of not more than 100° C. and for a period not substantially in excess of 60 minutes whereby substantially complete solution of the non-fat tissue occurs without appreciable saponification and emulsification of fat which remains in a free state, separating the fat from the aqueous constituent, washing the separated fat with a plurality of water washings one of which is a salt solution, and thereafter finally washing the fat with a solution containing from 0.5% to 1% phosphoric acid.

15. The process of rendering and refining crude lard which consists in mechanically reducing the tissue, contained in the lard by maserating the crude lard, admixing therewith a caustic alkaline solution having a pH value not less than 12.9 and in a proportion substantially between ½ and 1 part by weight of the crude lard, heating the mixture to a temperature substantially between 80° to 100° C. for a period substantially between 30 minutes to 60 minutes whereby substantially complete dissolution of non-fat tissue solids takes place without appreciable saponification of the fat, separating the fat from the aqueous alkaline liquor, washing the hot separated fat with an aqueous washing solution containing approximately 5% sodium chloride and 0.05% to 0.10% calcium chloride and in the approximate proportion of ¼ washing solution to 1 part fat, separating the fat from the aqueous salt wash and washing the fat with heated water, and separating the fat from the wash water.

16. The process of rendering and refining crude lard which consists in mechanically mascerating it to disintegrate raw animal tissue therein, adding an aqueous alkaline solution, the alkalinity of which is equivalent to at least 0.4% sodium hydroxide in water and mixing the same with the ground crude lard in the approximate proportion by weight of ½ to 1 part solution to 1 part crude lard, heating the mixture to between 70 to 100° C. whereby substantially complete solution of the solid matter takes place thereby thoroughly rendering and refining the fat, separating the rendered and refined fat from the aqueous constituents, and washing the separated fat with water.

FRED E. DEATHERAGE.

REFERENCES CITED

The following references are of record in the file of this patent:

UNITED STATES PATENTS

| Number | Name | Date |
| --- | --- | --- |
| 1,755,135 | Shipner | Apr. 15, 1930 |
| 1,973,790 | Appleton | Sept. 18, 1934 |
| 2,156,985 | Hempel | May 2, 1939 |
| 2,167,043 | Haneschka | July 25, 1939 |
| 2,234,379 | Martin | Mar. 11, 1941 |
| 2,352,229 | Shappirio | June 27, 1944 |

FOREIGN PATENTS

| Number | Country | Date |
| --- | --- | --- |
| 377,336 | Great Britain | July 28, 1932 |
| 381,342 | Great Britain | Oct. 6, 1932 |
| 500,645 | Great Britain | May 10, 1937 |
| 449,246 | Great Britain | June 16, 1936 |

Certificate of Correction

Patent No. 2,456,684.                                                                    December 21, 1948.

FRED E. DEATHERAGE

It is hereby certified that error appears in the printed specification of the above numbered patent requiring correction as follows:

Column 8, line 20, for "650° C." read *65° C.*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*